H. H. DOW.
APPARATUS FOR CONSERVING HEAT.
APPLICATION FILED AUG. 6, 1909.
1,094,061. Patented Apr. 21, 1914.
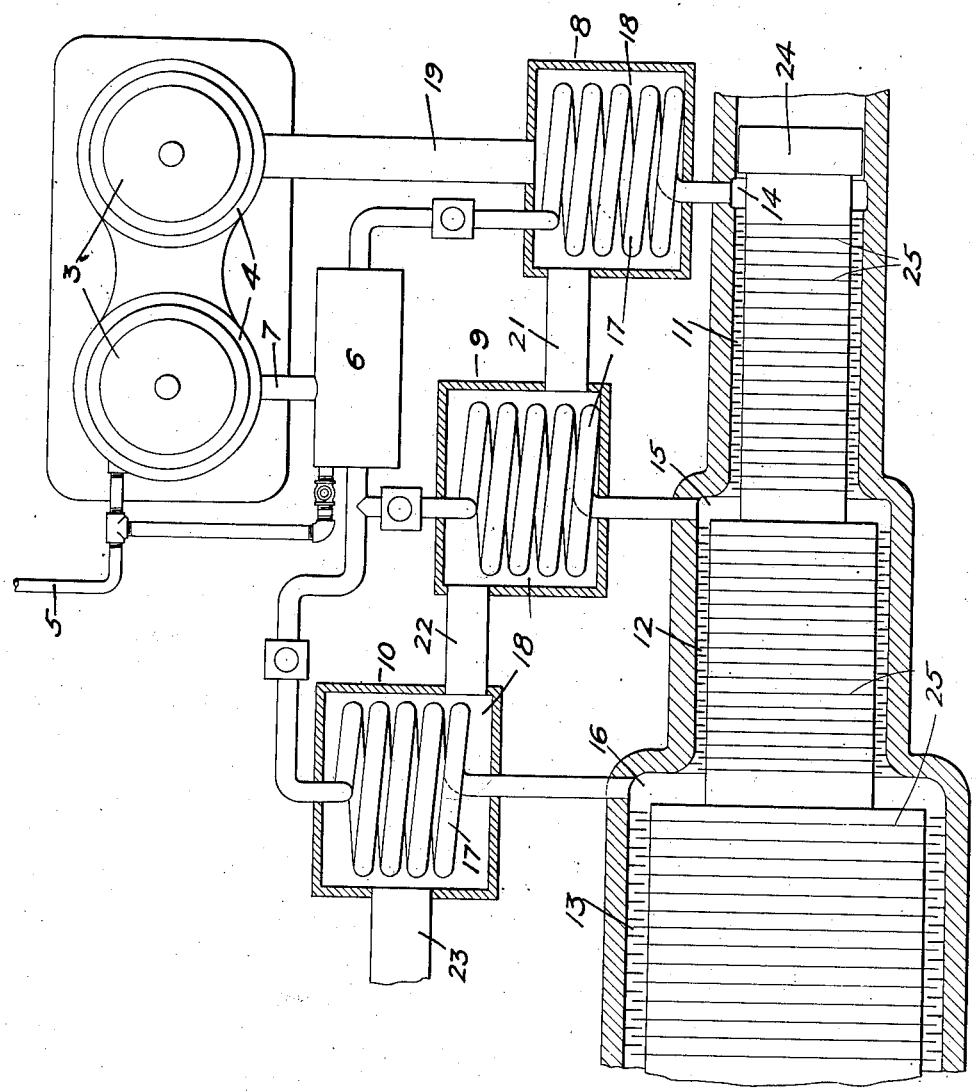
WITNESSES:
INVENTOR.
BY Herbert H. Dow
HIS ATTORNEY IN FACT.

UNITED STATES PATENT OFFICE.

HERBERT H. DOW, OF MIDLAND, MICHIGAN, ASSIGNOR, BY MESNE ASSIGNMENTS, TO THE COLONIAL TRUST COMPANY, TRUSTEE, OF PITTSBURGH, PENNSYLVANIA, A CORPORATION OF PENNSYLVANIA.

APPARATUS FOR CONSERVING HEAT.

1,094,061. Specification of Letters Patent. Patented Apr. 21, 1914.

Original application filed June 23, 1906, Serial No. 323,106. Divided and this application filed August 6, 1909. Serial No. 511,579.

*To all whom it may concern:*

Be it known that I, HERBERT H. Dow, a citizen of the United States, and a resident of Midland, in the county of Midland and State of Michigan, have made a new and useful Invention in Apparatus for Conserving Heat, of which the following is a specification, this application being a division of an application filed by me June 23, 1906, Serial No. 323,106.

This invention relates to means for conserving the heat contained in the exhaust gases of an internal combustion engine.

An object of this invention is to produce means for conserving heat energy contained in the exhaust gases of an internal combustion engine and rendering it available in the production of power.

A further object is to produce means for conserving heat in which the thermal energy contained in the exhaust gases of an internal combustion engine, is abstracted and delivered to a fluid pressure engine in such a manner that the conserved heat will be most effectively and efficiently utilized.

These and other objects I attain in the apparatus embodying the features herein described and illustrated.

In the drawings accompanying this application and forming a part thereof, I have illustrated a diagrammatic arrangement of apparatus embodying my invention.

A large amount of the thermal energy contained in the fuel of an internal combustion engine is discharged to the exhaust ports of the engine cylinder and various methods have been employed and proposed for conserving this energy, but none so far as I am aware, have been wholly successful or practical.

In carrying out my invention I employ means for abstracting the thermal energy contained in the exhaust gases of the internal combustion engine, in steps and for delivering the energy thus abstracted to an engine in such a manner that it is most efficiently utilized.

In carrying out my invention, I employ a series of pressure generating chambers through which the exhaust gases from the engine successively pass. The first generator of the series is adapted to abstract a certain amount of heat from the exhaust gases and to generate a relatively small amount of fluid at a relatively high pressure which corresponds to the temperature of the gases leaving the generator. The fluid generated is adapted to be delivered to a high pressure stage or section of a steam turbine. The second generator of the series, receives the gases discharged from the first generator and, by abstracting a portion of the heat, generates a larger amount of the fluid, but at a lower pressure than is generated by the first generator. The fluid generated by the second generator of the series, is delivered to a second stage or section of the fluid pressure engine to which the fluid from the first stage is also delivered. The gases are thus delivered through the succeeding generators, each of which abstracts a certain amount of the available heat and generates fluid at a pressure which corresponds to the temperature of the gases leaving the respective generators. The fluid generated in the successive generators, is delivered to the successive sections or stages of the fluid pressure engine where it combines with the fluid which has been expanded and has done work in the engine. By this arrangement a higher effective pressure is obtained than that obtained by any existing apparatus known to me.

In the existing apparatus, all of the heat is abstracted from the exhaust gases in one cooling or generating chamber and consequently the effective pressure generated corresponds to the temperature of the gases leaving the cooling chamber or generator. In my invention I employ a number of cooling chambers or generators which are disposed in series with relation to the exhaust port of the combustion engine and the means of pressures generated corresponds closely to the mean temperature of the gases entering and leaving the series of cooling chambers. It is apparent that the mean effective pressure produced by my invention is considerably higher than the effective pressure produced by the ordinary apparatus.

In the single sheet drawing accompanying this application and forming a part thereof, a preferred arrangement of apparatus embodying my invention is diagrammatically illustrated.

The cylinders 3 of a gas engine, which is diagrammatically shown in plan view, are provided with water jackets 4 which receive cooling water from any suitable source through a supply pipe 5. The water from the jackets is conducted to a feed-water heater 6 through a pipe 7.

The feed-water heater 6 is arranged to supply feed water to steam generators 8, 9, and 10, which respectively communicate with the initial stage 11, the intermediate stage 12 and the final low-pressure stage 13 of a steam turbine through the respective ports 14, 15 and 16. Within the heating chamber 18 of each steam generator is a system of water tubes 17 provided with adequate heating surface and steam space. The heating chamber 18 of the generator 8 communicates with the exhaust of the engine cylinders through a pipe or passage 19, the heating chamber of the generator 9 communicates with the heating chamber of the generator 8 through a pipe or passage 21 and the heating chamber of the generator 10 communicates with the heating chamber of the generator 9 through a passage 22. The heating generator of the generator 10 is provided with a passage 23 which communicates with the atmosphere or an additional generator if desired.

The steam turbine with which the generators communicate comprises a rotor element 24, provided with annular rows of moving blades 25, and an inclosing stationary casing 26 therefor, provided with annular rows of stationary vanes 27, which alternate with and coöperate with the moving blades 25. The exhaust of the high-pressure stage 11 of the turbine communicates with the inlet end of the intermediate stage 12 and the exhaust of the intermediate stage communicates with the inlet end of the low-pressure stage.

The exhaust gases discharged from the cylinders 3 of the engine are led by the passage 19 to the chamber 18 of the generator 8 where a portion of the heat contained in them is delivered to the water tubes 17 of the generator and is effective in generating steam. The exhaust gases are then conveyed to the chamber 18 of the generator 9 and caused to deliver a portion of the remaining heat to the water contained in the tubes 17 of the generator 9. The gases are then led to the chamber 18 of the generator 10 where the remaining available heat is delivered to the water in the tubes 17. The gas discharged through the passage 23 may be conducted to additional generators and further cooled, or it may be utilized in the feed-water heater 6. The heating surface of the generator 8 is so proportioned that a comparatively small amount of high pressure steam is generated by the exhaust gas, the ultimate pressure being, of course, dependent upon the heat of the exhaust. The generator 9, which receives gas from which a portion of the heat energy has been abstracted, is designed to generate a relatively large amount of steam at moderate pressure and the generator 10, which receives heating gases that are comparatively cool, is arranged to generate low-pressure steam in comparatively large amounts.

The steam from the generator 8 enters the turbine through the admission port 14 and in working on the high pressure or initial stage converts a portion of its heat or pressure energy into velocity energy and is discharged into the intermediate stage at a reduced temperature and pressure. The steam discharged from the high-pressure stage is augmented by live steam from the generator 9 of substantially the same pressure. The steam in working on the intermediate stage of the turbine delivers up heat and is discharged to the inlet of the low-pressure stage at about atmospheric pressure and a corresponding steam temperature, where it is mixed with steam generated by the generator 10. The steam, after working on the low-pressure stage, is discharged into the condenser. It is apparent that with such an arrangement of apparatus the exhaust gases of an internal combustion engine are cooled more effectively than would be the case if cooling were accomplished in one step. It is also apparent that higher pressure steam may be generated than would ordinarily be obtained.

The steam turbine is so constructed that more steam at intermediate pressure is required to produce an efficient operation of the turbine than can be delivered by the high-pressure stage while that stage is working efficiently. The low-pressure stage is so constructed that more low-pressure steam is required for an efficient operation than can be supplied by the intermediate stage. Under such conditions, it is apparent that, with proper governing means, the turbine will operate efficiently throughout greatly varying loads and practically all of the heat ordinarily lost in the exhaust of an internal combustion engine will be utilized.

What I claim is:

1. In combination with an internal combustion engine, a steam engine including a plurality of working stages or sections in which the pressure successively decreases, separate steam generators, each communicating with a separate stage or section, and means for conveying exhaust gases from the internal combustion engine to the generators and from one generator to another at successively decreasing temperatures.

2. In combination with an internal combustion engine, and a steam engine including a plurality of working stages or sections in which the pressure successively decreases, separate steam generators, each communicating with a separate stage or section of said engine, and means for delivering the exhaust gases from said internal combustion engine to said generators at successively decreasing temperatures.

3. In combination with a gas engine, a turbine consisting of a plurality of stages, separate steam generators in series with the exhaust port of the gas engine to receive heat therefrom at successively decreasing temperatures, and means for delivering steam from said steam generators to successive stages of said turbine.

4. In combination with an internal combustion engine, a plurality of steam generators connected in series with the exhaust ports of said internal combustion engine and receiving heat therefrom at successively decreasing temperatures, and an engine including a plurality of working stages or sections at successively decreasing pressures, each of which communicates with one of said generators.

In testimony whereof, I have hereunto subscribed my name this 28 day of July, 1909.

HERBERT H. DOW.

Witnesses:
 Thos. Griswold, Jr.,
 Rupert E. Paris.